United States Patent

Negoro

[15] 3,688,642
[45] Sept. 5, 1972

[54] PATTERN GUIDE SYSTEM
[72] Inventor: Kaiji Negoro, Montebello, Calif.
[73] Assignee: Anellux Systems Corporation, El Segundo, Calif.
[22] Filed: Aug. 13, 1970
[21] Appl. No.: 63,379

[52] U.S. Cl..................90/13 C, 318/578, 318/593
[51] Int. Cl.............................................B23c 1/16
[58] Field of Search.....90/13 C, 13.5, 13.8; 318/593, 318/578

[56] References Cited

UNITED STATES PATENTS

| 2,717,979 | 9/1955 | Gardiner | 318/593 |
| 3,065,554 | 11/1962 | Colabella, Jr. | 90/13 C |
| 3,101,436 | 8/1963 | Younkin | 90/13 C |

Primary Examiner—Gil Weidenfeld
Attorney—Jessup & Beecher

[57] ABSTRACT

A conventional type of tool control system consists of a stylus which is guided around a predetermined pattern. By suitable servo mechanisms (usually hydraulic powered) a cutting tool is caused to follow the same path of movement as the stylus, and in so doing cuts a work piece so as to substantially duplicate the pattern.

This invention relates to a pattern guide system, and more specifically to an adapter by means of which existing tool control apparatus may be wedded to existing data tape tool control systems, to provide a simplified system that greatly expedites the driving of a cutting tool into a work piece.

It is also known to drive a cutting tool over a predetermined path by causing the drive motors that control the position of the tool (or more broadly that control the relative position between the tool and the work piece), to move in accordance with stored data (usually digital), in a particular manner. In this way a large number of duplicate pieces may be cut by the tool simply by running the tape over and over again and feeding its output to the tape controlled tool.

In the present invention the output from the tape is caused to drive a pattern simulator member which carries — not the tool or the work piece — but instead carries a small socket in which rests the stylus of the first system described above. Thus the socket is caused to deflect the stylus of the first system and drive the tool (or reciprocally the work piece) in the desired manner, in accordance with data stored on and read from the tape.

2 Claims, 2 Drawing Figures

PATENTED SEP 5 1972

3,688,642

INVENTOR.
KAIJI NEGORO

BY JESSUP AND BEECHER
Warren T. Jessup
ATTORNEYS

PATTERN GUIDE SYSTEM

BACKGROUND OF THE INVENTION

Stylus Controlled System

It is known in the art to provide a cutting or milling tool which is moved in three dimensions by means of a tracing head, which has a depending stylus. Slight deflection of the stylus from its neutral position accuates a servo mechanism (usually hydraulically operated) which drives both the stylus and the cutting tool in such a direction as to restore the stylus to its neutral position. Thus continuous deflection of a stylus along and around a predetermined pattern will cause a continuous driving of the system so as to cause the cutting head to follow a path determined by the pattern against which the stylus is pressed. In actual practice it is often found more convenient to link the servo system — not to the cutting tool — but to a table on which is mounted the work to be cut. The table is usually a multipart structure which may be moved in two, and sometimes three, axes, so that relative movement in X, Y and Z may be achieved between the cutting head and the work piece. For ease of description it will be assumed hereinafter that the cutting tool is moved in synchronism with the stylus by the servo system above described, although it is to be understood that in principle the system involves, more broadly, simply relative movement between the cutting tool and the work piece.

Systems such as described above are known in the art. For example, attention is invited to U.S. Pat. Nos. 2,332,532; 2,835,266; and 3,390,859.

Tape Controlled Tool System

It is also known in the art to control relative movement between a cutting tool and a work piece along two or three axes as desired, by energizing the driving motors which provide relative positioning between tool and work piece, in accordance with data recorded on magnetic tape, or otherwise stored on any suitable signal storage medium. Inasmuch as considerable power is required to effect relative movement between the cutting tool and the work piece, much gain in power is required between the tiny signal derived from the magnetic tape and the actual power that must be applied to the cutter or work piece. This high gain in power must be done with extreme precision in order that the work piece may move precisely and accurately in accordance with the data stored on the tape. Such systems are therefore quite costly and, coming chronologically after the aforementioned stylus control systems, have not as yet acquired the sophistication and economy of the stylus control systems. Such tape control tool systems are known in the art, however, and reference to U.S. Pat. No. 3,188,541 is made to that end.

SUMMARY OF THE PRESENT INVENTION

In accordance with the present invention digital output from a tape is caused to position, on two or three axes, a pattern simulator. The ultimate output member of this simulator carries a small socket in which resides the end of a stylus of a hydraulically driven pattern controlled system, as described above. Thus instead of requiring the stylus to be constantly deflected along and around an actual physical pattern, the stylus is caused to be deflected in the same manner by the tape controlled movement of the socket mounted on the pattern simulator.

Thus the efficiency, ease, and precision, of the tape control system is elegantly wedded to the power embodied in the already-existent pattern trace systems.

DESCRIPTION OF THE DRAWINGS

The adapter of the present invention is shown in FIG. 1. The manner in which the two systems are merged by the adapter of FIG. 1 is illustrated in FIG. 2.

DESCRIPTION OF THE INVENTION

Figure 1:
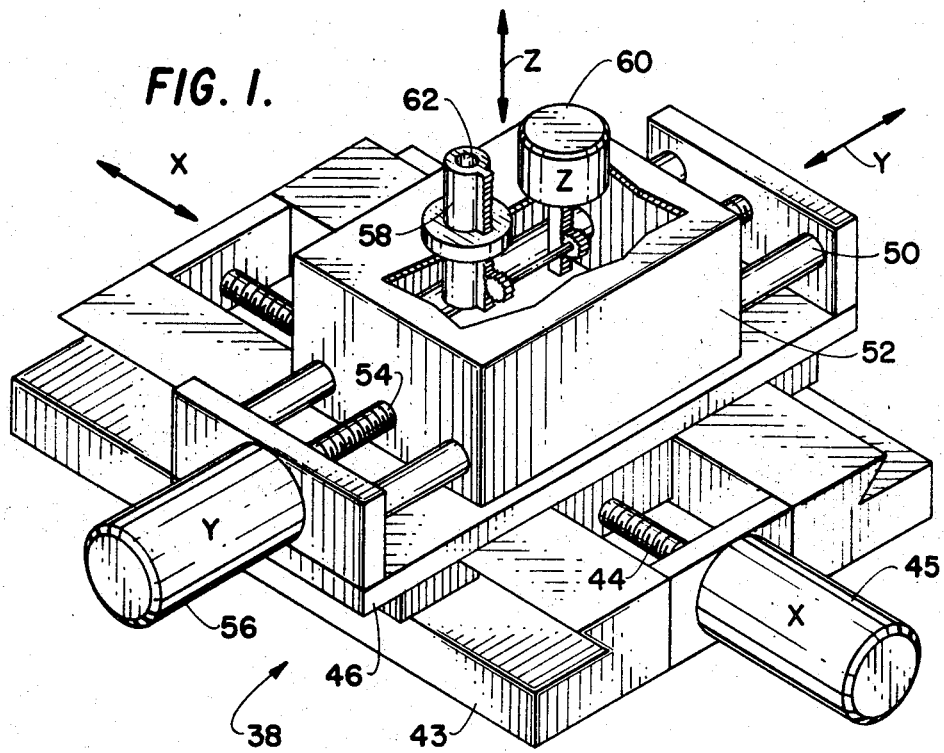
Figure 2:
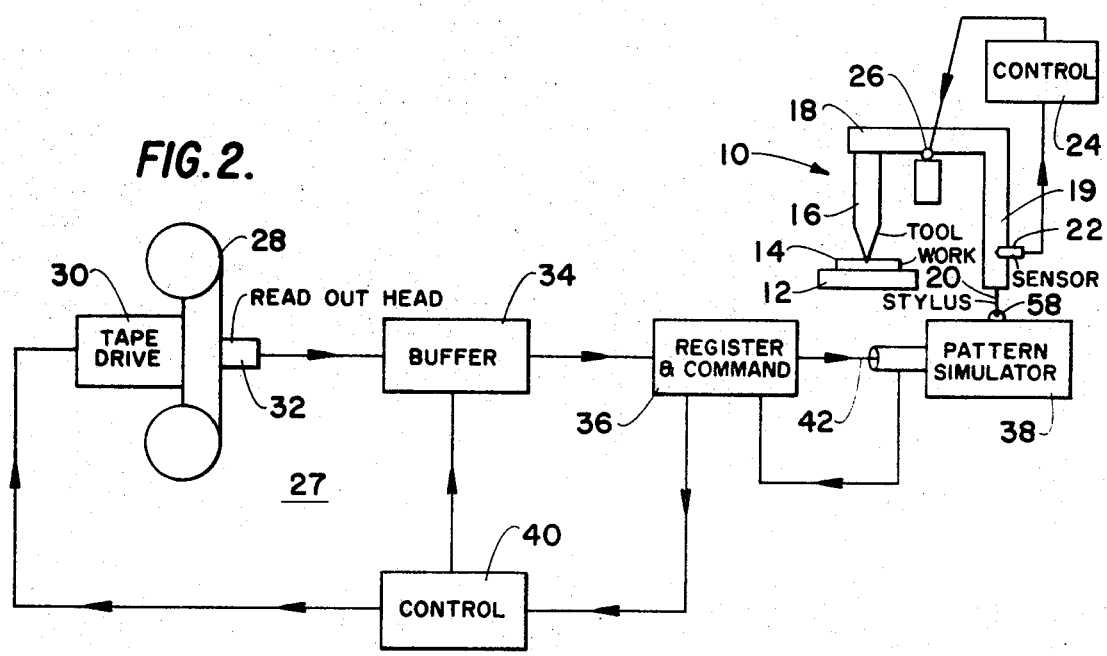

In order to better understand the invention shown in the form of the adapter in FIG. 1, the two systems of FIG. 2 and their merger will first be described.

10 designates, in somewhat schematic form, a typical pattern controlled hydraulic system, consisting of a work carrier 12, to which is secured a work piece 14 which is to be cut according to a certain design or pattern, by tool 16.

As shown schematically the tool 16 is mounted in a tool-and-stylus holder 18, one arm 19 of which holds a deflectable stylus 20. Deflection of the stylus 20 in the arm 19 is sensed by a sensor 22 and converted by a controller 24 into a drive shown schematically as 26. This causes the holder 18 to move in such a way as to neutralize the deflection between the stylus 20 and the arm 19, i.e. bring back the stylus 20 to neutral position relative to the holder 18. Thus as long as the stylus 20 is held deflected in a given direction, the holder 18 will be caused to move steadily in that given direction by the control 24. In this manner the cutting tool 16 may be caused to follow any desired path in its cut of the work piece 14, depending on the direction in which the stylus 20 is deflected relative to the holder 18.

As a matter of practice, certain sophisticated installations — instead of causing the tool 16 to move — cause the work holder 12 to move in a reciprocal direction. At the same time the pattern is caused to be servo driven in a direction to neutralize the stylus deflecting the arm 19. This is done in a well known fashion by suitable servo controls, driven usually hydraulically.

As noted herein, such stylus controlled hydraulic systems are usually used in conjunction with a pattern against which the stylus 20 bears. The stylus is deflected around the course of the pattern, either manually or by some automatic means which constantly presses the stylus 20 against the pattern and at the same time deflects the stylus along the edge of the pattern. This causes the stylus 20 to trace the outline of the pattern. Corresponding relative movement between the tool 16 and the work 14 thus is effected, with a consequent cutting of a work piece 14, which duplicates the pattern against which the stylus 20 rides.

Referring now to the tape aspect of the system, digital data is stored on a magnetic tape 28 which is driven by a tape drive 30 past a read out head 32. The signals are passed in conventional fashion through a buffer 34 and thence to a register and command 36 from whence they are translated into drive signals that drive a moveable member, here shown as a pattern simulator 38. Suitable control feedback is provided through a control block 40. Such systems are known in the art for causing the moveable member 38 to move in a given pattern along two or three axes. When the member 38 carries a work piece against which bears a cutting tool, the cutting tool cuts the work piece according to a pattern determined by the nature of the signals read out from the tape 28.

For simplicity of description a single axis of control will be initially assumed. In actual practice the tape 28 contains signals stored for two or three axes which drive the pattern simulator 38 along X, Y and Z axes. Thus the control line shown schematically at 42 represents the driving of the pattern simulator 38 by three separate sets of control signals, which position three different control servo motors along X, Y and Z axes.

In the known tape control systems it is necessary to generate considerable power for the movement of the work carrying tables, here exemplified by 38, because of the considerable force required to effect relative movement between the work piece and the tool, as the tool cuts away at the work piece.

In the present invention only a moderate amount of power is needed, because the signals at 42 are not required to move an actual work piece against the resistance of the cutting tool, but instead simply activate and position the pattern simulator shown in FIG. 1, which will now be described.

The pattern simulator 38 consists of a base 43 to which is mounted a servo drive motor 45, which turns a lead screw 44. The lead screw 44 threadedly causes a member 46 to move back and forth along the line shown by the arrow labled X. This movement may be called the X axis movement and the member 46 may be conveniently called the X table. Likewise servo motor 45 now becomes the X drive.

Mounted upon the X table 46, on guide rods 50, is a member 52 which is moved back and forth along in the direction indicated by the arrow Y. The member 52 may thus be called the Y table, being moved in the Y axis by the lead screw 54 driven by the Y motor 56. Finally, a Z member 58 is driven up and down in the direction shown by the arrow Z by a Z motor 60 mounted on and carried by the Y table 52. The Z member 58 has at its upper end a socket 62, in which resides the tip end of the stylus 20 shown in FIG. 2.

Signals from the tape 28 are fed to the respective X, Y, and Z motors 45, 56, and 60, causing the socket 62 to move along any of the three axes, and cause a corresponding deflection of the stylus 20. The stylus 20 thus feels a deflection exactly the same as if it were being guided around the surface of a pattern, as has been heretofore done in connection with the above described hydraulically driven pattern controlled tools.

It is to be understood and it is well known in the art that the essence of these operations is relative movement between tool and work, as the output, and between stylus and pattern (or in the present instance between stylus and socket 62), as the input. Thus it will be readily understood that if, instead of causing the deflection of the stylus 20 to move the holder 18, one may cause the control 24 to instead move the pattern simulator 38 and correspondingly move the tool holder 12. Thus whether the control 24 moves the holder 18 or the pattern simulator 38 does not matter, as long as it does effect a return of relative positioning of the stylus 20 to its neutral or undeflected position with respect to the holder 18. As noted, these techniques are known in the art and further description is unnecessary.

From a cybernetic standpoint it will be seen that the present invention involves the interlinking of two known closed loop systems — the hydraulically driven pattern control system shown at 10, and the tape controlled loop shown at 27.

The tape control loop 27 may have a clock control in 40 to regulate how fast the tape drive 30 will feed the X, Y, and Z signals to the simulator 38. This feed rate must be adjusted so that it does not exceed the maximum rate at which the hydraulic system 10, to which it is wedded, can accomodate the signals.

A more sophisticated system in accordance with the present invention involves the use of known techniques to sense the torque applied by the X, Y, and Z drive motors 45, 56, and 60 and thus sense the force with which the stylus is resisting being deflected by the socket 62. When the torque applied by any of the deflection motors reaches a certain value, the control 40 brings the tape drive 30 to a temporary halt, and allows the hydraulic system 10 to catch up and return the stylus 20 to its neutral position, or accurately to a position where the deflection resistance of the stylus 20 is below the torque limit to which the deflecting servo motors 45, 56, and 60 have been set to respond. In this way the system automatically accomodates itself to any hydraulic drive system 10 and it is not necessary to predetermine the maximum rate at which the system 10 can be driven.

What is claimed is:

1. In combination with a controlled machine tool apparatus, said apparatus including a tool for producing operations upon a work piece, a pattern stylus, control means connected to said pattern stylus, upon movement of said pattern stylus said control means causing appropriate relative movement between said work piece and tool, an assembly comprising:

a pattern simulator connected to said stylus to move said stylus in at least one axis; and data means including data storage means which is capable of producing signals per a particular program, drive means connected to said storage means and adapted to receive said signals, said drive means responding to said signals to move said pattern simulator and thereby produce the same effect that said pattern stylus would produce were it in physical contact with a pattern corresponding to said program.

2. The combination of claim 1 wherein:

said pattern simulator includes means to move said pattern stylus in three axes.

* * * * *